(12) United States Patent
Kot et al.

(10) Patent No.: US 7,324,662 B2
(45) Date of Patent: Jan. 29, 2008

(54) METHOD, SOFTWARE, AND DEVICE FOR HIDING DATA IN BINARY IMAGE, WHILE PRESERVING IMAGE QUALITY

(75) Inventors: Alex Chi Chung Kot, Singapore (SG); Huijuan Yang, Singapore (SG); Haiping Lu, Toronto (CA)

(73) Assignee: Nanyang Technological University, Singapore (SG)

( * ) Notice: Subject to any disclaimer, the term of this patent is extended or adjusted under 35 U.S.C. 154(b) by 423 days.

(21) Appl. No.: 10/958,033

(22) Filed: Oct. 4, 2004

(65) Prior Publication Data

US 2005/0259844 A1  Nov. 24, 2005

Related U.S. Application Data

(60) Provisional application No. 60/573,454, filed on May 21, 2004.

(51) Int. Cl.
 *G06K 9/00*  (2006.01)
(52) U.S. Cl. .................... 382/100; 380/51; 370/522
(58) Field of Classification Search ............... 382/100; 713/176, 179; 380/51, 54, 201, 210, 252, 380/287; 283/72, 74–81, 85, 93, 113, 901; 370/522–529
See application file for complete search history.

(56) References Cited

U.S. PATENT DOCUMENTS 6,993,150 B2 *  1/2006  Haynes ...................... 382/100

2005/0025333 A1 *  2/2005  Fujii et al. .................. 382/100
2007/0092102 A1 *  4/2007  Kot et al. .................... 382/100

OTHER PUBLICATIONS

Yu-Chee Tseng and Hsiang-Kuang Pan, "Data Hiding in 2-Color Images," IEEE Transactions on Computers, vol. 51, No. 7, Jul. 2002, pp. 873-878.
Wu et al. "Data Hiding in Digital Binary Image", IEEE International Conference on Multimedia and Expo, 2000.
Chen et al., "A secure Data Hiding Scheme for Binary Images", IEEE Transactions on Communications, Aug. 2000, pp. 1227-1231, vol. 50, No. 8.
Tseng et al., "Secure and Invisible Data Hiding in 2-Color Images", IEEE Infocom 2001, pp. 887-896.

* cited by examiner

*Primary Examiner*—Samir Ahmed
*Assistant Examiner*—Ehsan D Mafi
(74) *Attorney, Agent, or Firm*—Dinsmore & Shohl, LLP

(57) ABSTRACT

A method of embedding watermark data into a two-colour (binary) image includes dividing the image into blocks and assessing the suitability of each block to embed a bit of watermark data by assessing whether or not the flipping of a defined pixel in each block affects the visual attributes of said block in manner to be perceptible by the human eye. Data is only embedded in those blocks determined to be suitable for data embedding, by flipping the defined pixel, as required. A recipient of the document may similarly assess which blocks contain watermark data, by assessing the suitability of each block in the document to embed such data. Conveniently, watermark data may be extracted without further information about the data's location within a document.

34 Claims, 12 Drawing Sheets

LEGEND
- ■ BLACK
- ☐ WHITE
- ▨ EITHER

LEGEND
■ BLACK
□ WHITE
▨ EITHER

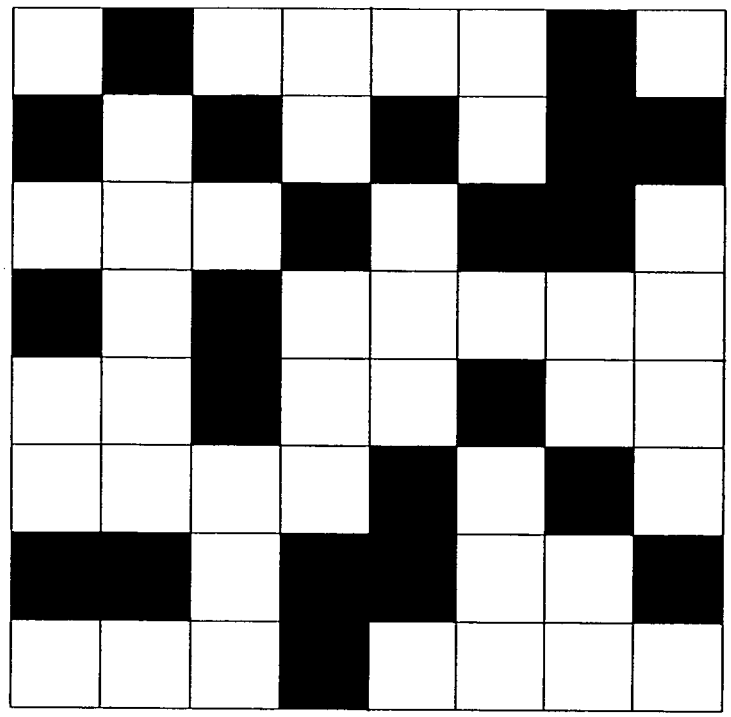
FIG. 6
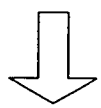
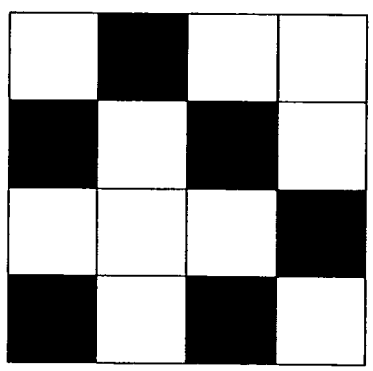 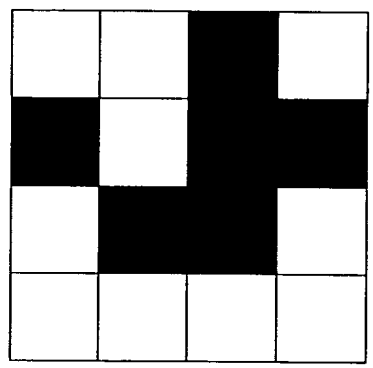
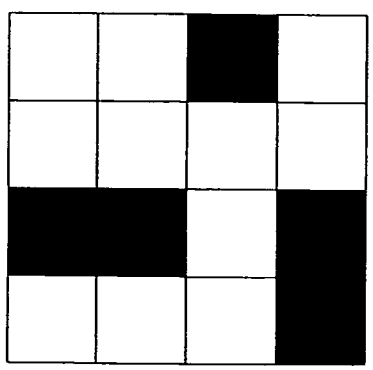 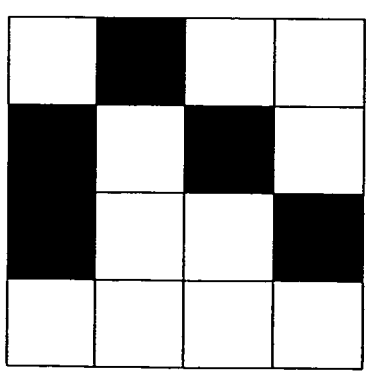

METHOD, SOFTWARE, AND DEVICE FOR HIDING DATA IN BINARY IMAGE, WHILE PRESERVING IMAGE QUALITY

CROSS-REFERENCE TO RELATED APPLICATIONS

This application claims benefits from U.S. Provisional Patent Application 60/573,454 filed May 21, 2004, the contents of which are hereby incorporated by reference.

FIELD OF THE INVENTION

The present invention relates generally to data hiding, and more particularly to data hiding in two-colour (binary) images.

BACKGROUND OF THE INVENTION

The proliferation of digital media such as digital images, audio, video, and text images (documents) has generated significant interest in copyright protection, annotation, and authentication. Watermarking has been identified as a promising mechanism for copyright protection, annotation, and authentication. Watermarking promises the ability to embed inalterable watermark data directly in a digital file. At a later time, the data may be extracted to identify the origin of the digital file and verify its authenticity.

Typically, watermarking is achieved by changing a portion of the visible image. For example, single pixels within an image may be modified or "flipped" in order to transport data. Embedding watermark data in binary images, however, has presented significant challenges as changing pixels in such images is easily noticed.

Nevertheless, numerous data-hiding methods for embedding watermark data in binary documents have been proposed. For example, Min Wu, Edward Tang and Bede Liu, "Data Hiding in Digital Binary Image", *IEEE International Conference on Multimedia and Expo.*, 2000, pp. 393-396 proposes dividing a document into blocks, and locating the most suitable pixel within each block to embed watermark data. A list, based on the block size, is used to rank the pixels in blocks in order of appropriateness for flipping. Such ranking, however, is quite subjective and may lead to mixed results depending on the image as a whole. Moreover, for small blocks (e.g., 8×8 pixels), it is difficult to find a suitable list to ensure that every block has at least one flippable pixel. As a consequence, the final result is often not pleasing, as less than ideal pixels may be flipped in some blocks, salt-and-pepper noise, or erosion will be created in this case.

Another known scheme is detailed in Yu-Chee Tseng, Yu-Yuan Chen and Hsiang-Kuang Pan, "A Secure Data Hiding Scheme for Binary Images", *IEEE Transactions on communications*, Vol. 50, No. 8, pp. 1227-1231, August 2002. The authors propose binary image watermarking by partitioning images into fixed-sized blocks. A secret key and a weight matrix are used to protect the hidden data. Given an image with block size m×n, the scheme can hide as many as $\lfloor \log_2(mn+1) \rfloor$ bits of data by flipping at most two bits per block. However, the visual effects of the scheme are noticeable because of the randomness used to choose the location for flipping. As a result, the watermarked document appears to be noisy and is not suitable for text document authentication.

Another known scheme detailed in Yu-Chee Tseng and Hsiang-Kuang Pan in IEEE Transactions on Computers, Vol. 51, No. 7, pp. 873-878, 2002, allows bits within the image to be flipped, if the flipped bit is adjacent to another bit that has a value equal to the now-flipped bit. The adjacent bit thus masks the flipping of the information-bearing bit. However, the resulting watermarked binary image looks very noisy and has many protrusions.

All of these known methods, however, minimally preserve the image quality of the watermark data-embedded image. Moreover, many of them require complex calculations.

Another known watermarking method is best suited to binary text documents. In this method, the data is embedded in the 8-connected boundary of a character. Pairs of patterns that are dual to each other are used for watermark embedding and extraction, which makes it easy for the watermark retrieval without referring to the original. However, the available number for each pattern pairs depends on the resolution of the document images, thus the available patterns can be used for the watermark embedding are very limited, and the capacity of the watermark is relatively low. As well, the method is believed to be computationally complex as contour tracing is required for each character and pattern matching is required for watermark embedding and extraction.

Accordingly, an improved computationally simple method of embedding watermark data in binary text and non-text images while preserving image quality is desired.

SUMMARY OF THE INVENTION

In accordance with an aspect of the present invention, data is hidden in a two colour (binary) image by dividing the image into blocks. The suitability of each block to embed a bit of watermark data is assessed by assessing whether or not the flipping of a defined pixel in each block affects the visual attributes of the block in a manner to be perceptible by the human eye. Data is only embedded in those blocks determined to be suitable for data embedding, by flipping the defined pixel, as required.

A recipient of the document may blindly assess which blocks contain hidden data, by determining the suitability of each block in the document to embed such data.

In a preferred embodiment, 3×3 blocks are used, and the centre pixel may be flipped to embed watermark data. Two pixel connectivity conditions are used to assess if watermark data may be embedded in a block: (1) the number of solid (black or white) rows and columns through the centre pixel should be invariant before and after flipping the centre pixel; and (2) the number of white interior right angles (i.e., right angles formed with the centre pixel) including the centre pixel should be the invariant before and after flipping the centre pixel. Additionally, (3) the number of adjacent black edge pairs (i.e., formed of two adjacent 3 pixel black edges) about a black centre should be the invariant before and after flipping the centre pixel.

In accordance with another aspect of the present invention, there is provided a method of embedding watermark data in a two-colour rasterized image, the method including: dividing the image into a plurality of blocks; assessing for each of the plurality of blocks whether a defined pixel within the block may be altered to store a bit of the data within the block without altering the visual attributes of the block in a manner to be materially perceptible to the human eye, to determine a set of the plurality of blocks suited to store a bit of the data; and storing a bit of the data in each of the plurality of blocks assessed as suited to store a bit of the data.

In accordance with yet another aspect of the present invention, there is provided a method of extracting watermark data from a two-colour document, the method including: receiving the two-colour document containing the watermark data embedded therein, and dividing the document into m×n blocks. The method also includes assessing for each of the plurality of blocks whether a defined pixel within the block may be altered to store a bit of the data within the block without altering the visual attributes of the block in a manner to be perceptible by the human eye, using at least one logical condition to determine a set of the plurality of blocks suited to store a bit of the data. The method further includes extracting a bit of the watermark data in each of the plurality of blocks assessed as suited to store a bit of the data.

In accordance with still another aspect of the present invention, there is provided a method of determining if watermark data may be embedded in a two-colour rasterized image, the method including dividing the image into a plurality of 3×3 blocks. The method also includes assessing whether a centre pixel of each of the blocks may be altered to store a bit of the data within the block, by assessing: (a) if the number of solid rows and columns through the centre pixel remains invariant before and after flipping the colour of the centre pixel; (b) if the number of white right angles through its centre pixel and around a black corner pixel remains invariant before and after flipping the colour of the centre pixel; and (c) if the number of adjacent black edge pairs about a black centre pixel remains invariant before and after flipping the colour of the centre pixel.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate by way of example only embodiments of the present invention.

FIG. 6 illustrates an exemplary 8×8 pixel image, divided into four non-overlapping 4×4 pixel super-blocks;

DETAILED DESCRIPTION

Figure 1:
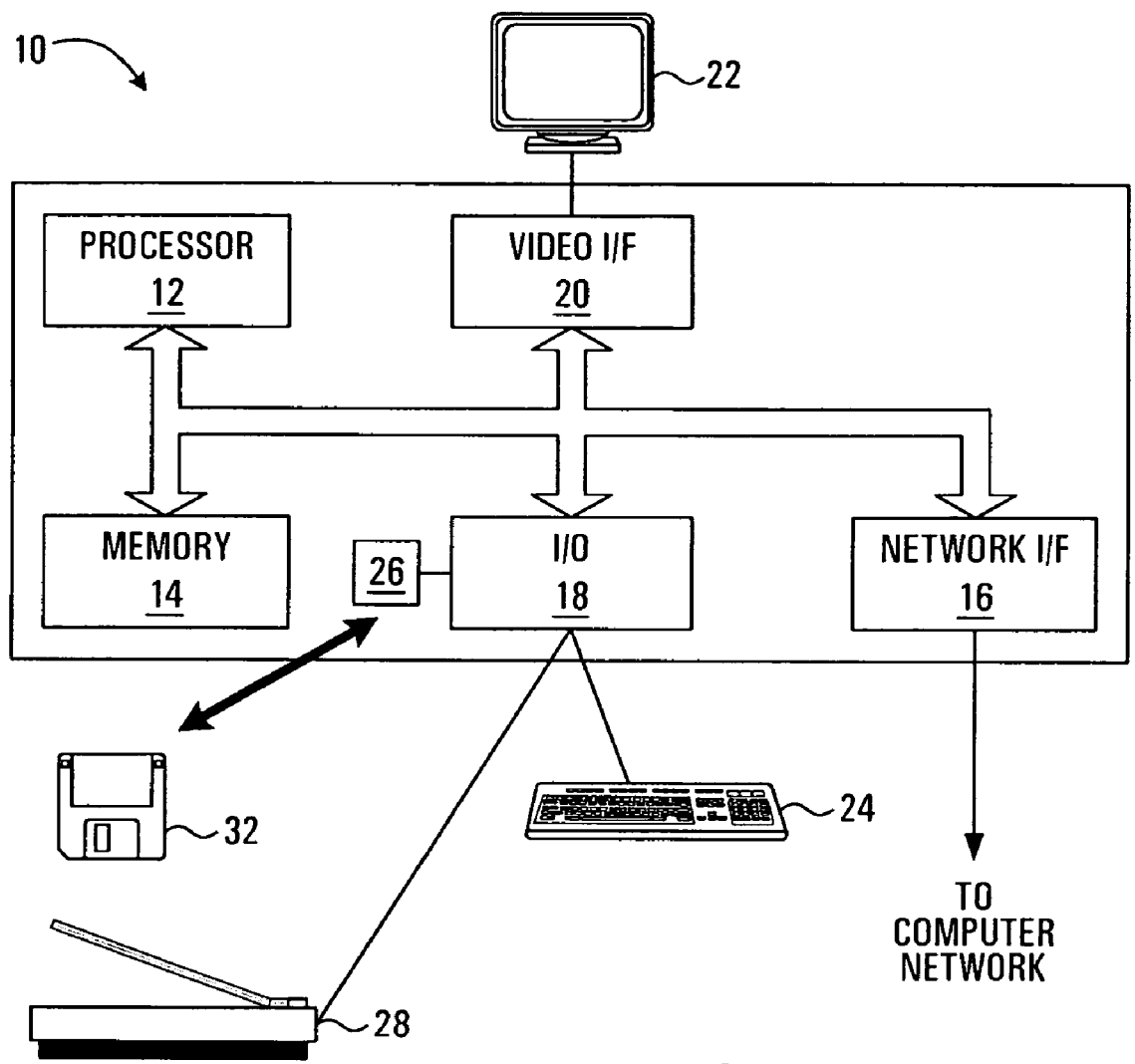
FIG. 1 is a simplified schematic block diagram of a computing device, including watermark data embedding software, exemplary of embodiments of the present invention.

FIG. 1 illustrates a general purpose computing device 10 storing and executing software exemplary of embodiments of the present invention. In the illustrated embodiment, device 10 is a conventional network capable multimedia computing device. Device 10 could, for example, be an Intel x86 based computer acting as a Microsoft Windows NT/XP/2000, Apple, or Unix based workstation, personal computer, or the like. Example device 10 includes a processor 12, in communication with computer storage memory 14; data network interface 16; input output interface 18; and video adapter 20. As well, device 12 includes a display 22 interconnected with video adapter 20; and several input/output devices, such as a keyboard 24 and disk drive 26, a document scanner 28, and a mouse (not shown) or the like. Optionally, device 10 may further include a peripheral (also not shown) for acquiring biometric data at device 10, such as a fingerprint reader or digital camera.

Processor 12 is typically a conventional central processing unit and may for example be a microprocessor in the INTEL x86 family. Of course, processor 12 could be any other suitable processor known to those skilled in the art. Computer storage memory 14 includes a suitable combination of random access memory, read-only memory, and disk storage memory used by device 10 to store and execute software programs adapting device 14 to function in manners exemplary of the present invention. Drive 26 is capable of reading and writing data to or from a computer-readable medium 32 used to store software to be loaded into memory 14. Computer-readable medium 32 may be a CD-ROM, DVD-ROM diskette, tape, ROM-Cartridge, or the like. Network interface 16 is any interface suitable to physically link device 12 to network 10. Interface 16 may, for example, be an Ethernet, ATM, ISDN interface, or modem that may be used to pass data from and to convention computer network (such as a local area network (LAN), wide area network (WAN), or the public internet), or another suitable communications network.

Computing device 10 stores software capable of embedding data into a two-colour document in manners exemplary of embodiments of the present invention. As will become apparent, the software divides a rasterized image into multiple blocks; assesses whether each of the multiple blocks lends itself to embedding a bit of data (i.e. whether or not it is "watermarkable"), by flipping a bit as required; and embeds data in those watermarkable blocks. In the disclosed embodiment, each block is evaluated as watermarkable or not, by assessing whether or not one pixel in the block may be modified without visually altering the block in a way that is likely material to a human observer. In the preferred embodiment, this is accomplished by conserving the connectivity of pixels within each block, as described below.

Complementary software capable of extracting watermark data from received documents may also be stored at device 10.

Figure 2:
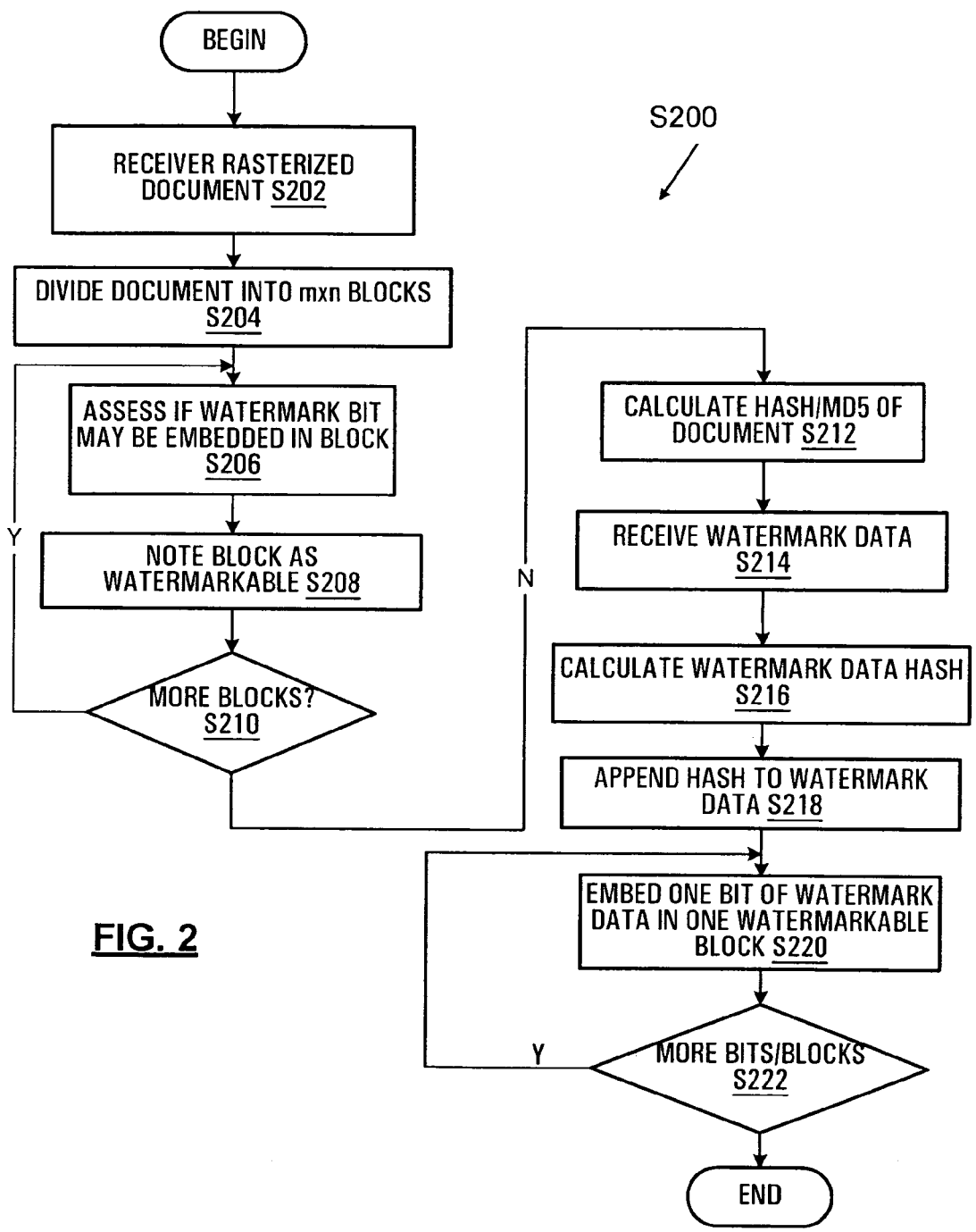
FIGS. 2-3 are flowcharts depicting steps performed at the device of FIG. 1, in manners exemplary of embodiments of the present invention.
Figure 3:
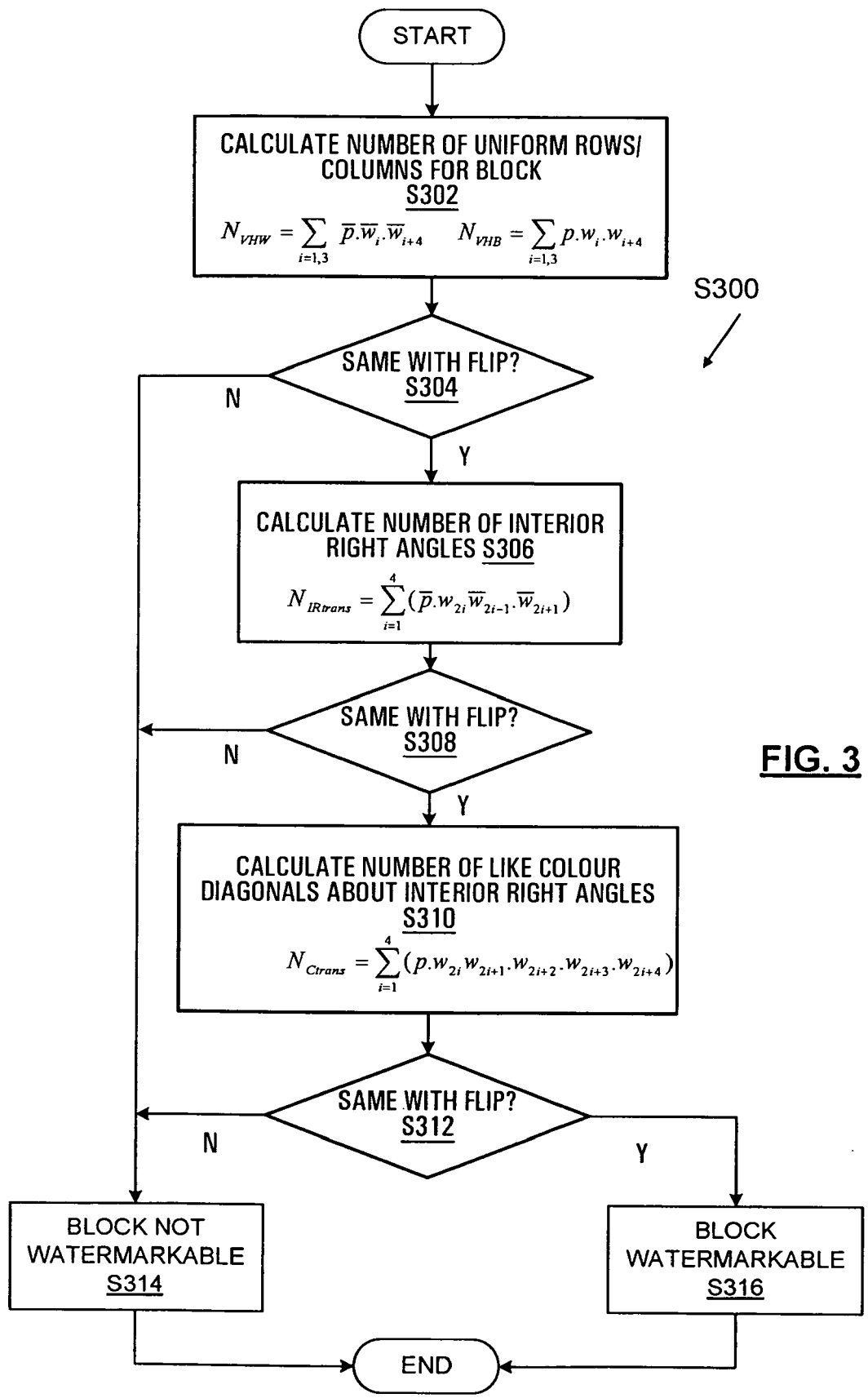

Steps S200 and S300 performed at computing device 10 to embed watermark data are illustrated in FIGS. 2-3.

As illustrated, a document to which a watermark is to be added is received in step S202. The document is an image in electronic form and has been digitized into a rasterized image and stored in a suitable image format. The image may, for example, be a jpeg, bitmap, tiff, gif, or similar image. The image is electronically stored as a W×H pixel image and may be formed as the output of a software program (such as a word processor, image editor, or the like), or the result of scanning a paper document. The image is a two-colour image (e.g., black and white). The document could be digitized and rasterized directly at device 10 using scanner 28 and conventional software.

In any event, once received, an image into which the data is to be embedded is divided into m×n blocks in step S204. In the exemplary embodiment, m=n=3. As will however become apparent, other block sizes with m≠n are possible.

Next, the suitability of each of the blocks as a holder of embedded data is assessed in step S206. Sub-steps S300 performed in step S206 are illustrated in FIG. 3. The suitability of each block is assessed by determining if inverting the colour of a selected pixel within the block affects the visual appearance of the block in a manner that would be perceived by a human viewer. In the exemplary embodiment, the centre pixel of each block is chosen to carry embedded watermark data, and three metrics of the block are calculated to determine if the centre information-bearing pixel may be modified. A person of ordinary skill will recognize that the centre pixel need not be chosen. However, so that no additional data needs to be conveyed with a document carrying watermark data, a defined pixel in each block is used. This, then, allows for blind extraction of embedded watermark data.

Figure 4:
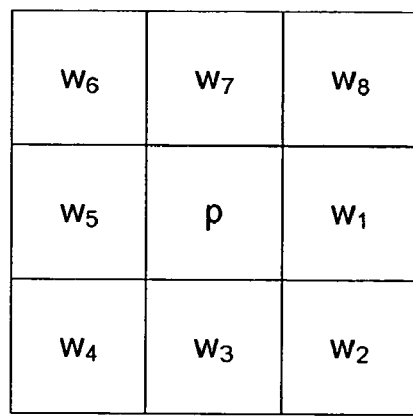
FIG. 4 illustrates an exemplary 3×3 pixel block of an image that may embed watermark data.

To best appreciate the conditions that are used to assess whether or not a block may embed watermark data, an exemplary 3×3 block 40 is illustrated in FIG. 4. The eight neighbors of the information-bearing centre pixel p are numbered $W_1$ through $W_8$. Notably, the odd numbered pixels are directly adjacent pixel p in a row or column (typically referred to as 4-neighbours of pixel p), while the even-numbered pixels are diagonally adjacent (all pixels are typically referred to as 8-neighbours of pixel p).

The ability to alter (or "flip") the centre pixel within the block depends mainly on transitions between the centre pixel and its eight neighbors. Mathematically, a "1" may be used to represent a black pixel and "0" represents a white pixel.

Specifically, the transition value along the horizontal, vertical, interior right angle, and sharp corner directions are calculated and used as the criteria for the watermark embedding. The pixels $w_1, w_2, w_3, \ldots w_8$ are the eight neighbors of pixel p are collectively denoted as N(p). The number of black pixels in N(p), plus the pixel p itself (if p is a black pixel), is denoted B(p).

$$B(p) = \sum_{i \in N(p)} w_i + p \left( \text{or for an } m \times n \text{ block}, B(p) = \sum_{i=1}^{m} \sum_{j=1}^{n} a(i, j) \right),$$

where a(i,j) are the pixels within the m×n block, at locations i,j).

The number of the all white rows and columns about the centre pixel, $N_{VHW}$, may be calculated as, $$N_{VHW} = \sum_{i=1,3} \bar{p} \cdot \bar{w}_i \cdot \bar{w}_{i+4}$$

The number of all black rows and columns about the centre pixel, $N_{VHB}$, may similarly be calculated as $$N_{VHB} = \sum_{i=1,3} p \cdot w_i \cdot w_{i+4}.$$

Where, $\bar{w}$ is the complement of w, and $\bar{p}$ is the complement of p.

The number of white interior right angles (i.e. including the centre pixel) in a block, about a black corner pixel, "IR Transition", $N_{IRtrans}$ may be calculated as:

$$N_{IRtrans} = \sum_{i=1}^{4} (\bar{p} \cdot w_{2i} \cdot \bar{w}_{2i-1} \cdot \bar{w}_{2i+1})$$

where, $\bar{w}_{2i+1} = \bar{w}_1$, if $2i + 1 > 8$.

The number of "C Transition" adjacent black-edge pairs, formed of two adjacent 3-pixel black edges about a black centre, $N_{Ctrans}$ may be calculated as follows:

$$N_{Ctrans} = \sum_{i=1}^{4} (p \cdot w_{2i} \cdot w_{2i+1} \cdot w_{2i+2} \cdot w_{2i+3} \cdot w_{2i+4}) \text{ where,}$$

$w_9 = w_1$, $w_{10} = w_2$, $w_{11} = w_3$, and $w_{12} = w_4$.

Now, in order for a change in the centre pixel to not have a material effect on the appearance of a 3×3 block, (1) Both $N_{VHW}$ and $N_{VHB}$ should remain invariant by flipping the centre pixel. That is, the number of white rows and columns through the centre pixel should not change and the number of black uniform rows and columns should not change, before and after flipping the centre pixel. In this way, the horizontal and vertical transitions from the centre pixel to its four neighbors are not changed by flipping the centre pixel;

(2) The numbers of white interior right angles $N_{IRtrans}$, including the centre pixel, about a black corner pixel, should be the same (be invariant) before and after flipping the centre pixel;

(3) The number of adjacent black edge pairs (i.e., formed of two adjacent 3-pixel black edges) about a black centre $N_{Ctrans}$ should be the same (invariant) before and after flipping the centre pixel.

Figure 5A:
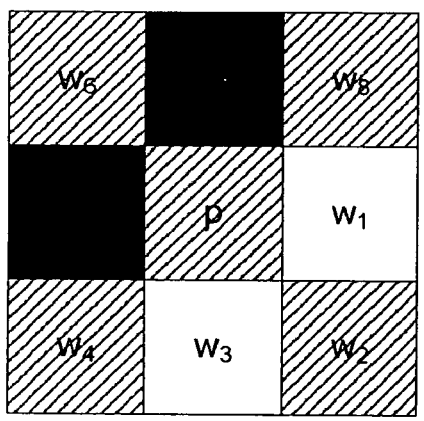
FIG. 5A illustrates an pattern in a 3×3 pixel block that may embed watermark data.
Figure 5C:
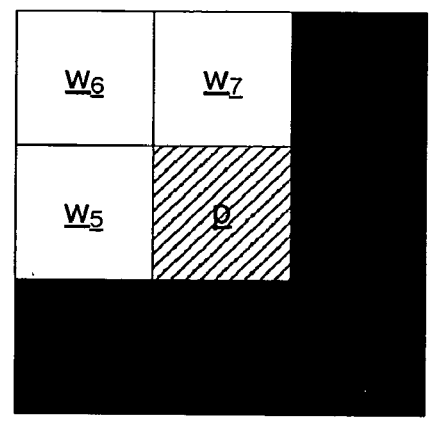
FIGS. 5B-5C illustrate patterns in a 3×3 pixel block that are excluded from embedding watermark data.
Figure 5B:
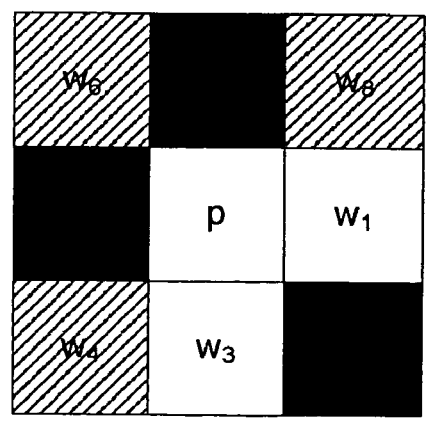

FIG. 5A illustrates the format of example blocks meeting condition (1) (i.e., a change in the centre pixel does not affect $N_{VHtrans}$) while FIGS. 5B and 5C respectively illustrate the format of blocks not meeting conditions (2) and (3) (i.e., a change in the centre affects $N_{IRtrans}$, and $N_{Ctrans}$, respectively). It can be observed that the suitable blocks are those that fall in the patterns illustrated in FIG. 5A, excluding however those that further fall in the patterns which are illustrated in FIGS. 5B and 5C. Of course, rotations and reflections of the depicted blocks of FIGS. 5A-5C will meet or be excluded by conditions (1)-(3).

The exemplary method looks for boundary pixels which happen to be in the pattern illustrated in FIG. 5A. This pattern actually occurs frequently in binary images. However, flipping the centre pixel cannot create another cluster or an isolated pixel, this scenario is dealt with by condition (2), shown in FIG. 5B. It is annoying to the human eye when flipping the pixels in sharp corners. So, this scenario is further excluded from flipping by condition (3), shown in FIG. 5C.

Figure 5D:
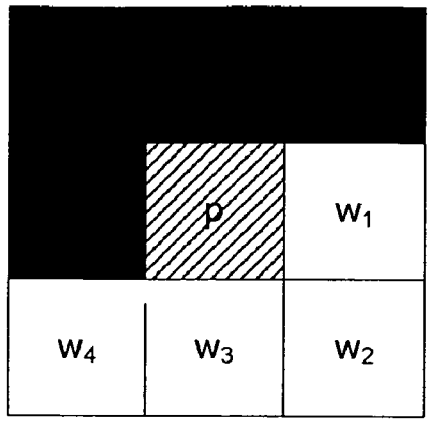
FIG. 5D illustrates those patterns included in FIG. 5A, but excluded in FIGS. 5B-5C.
Figure 5D:
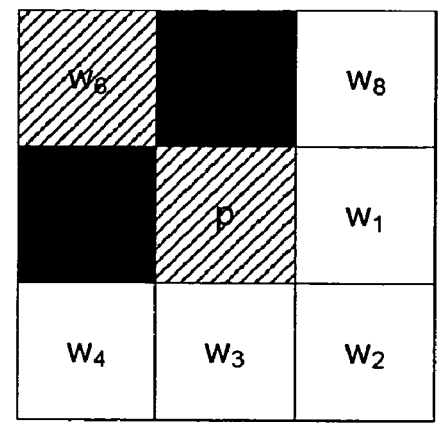
Figure 5D:
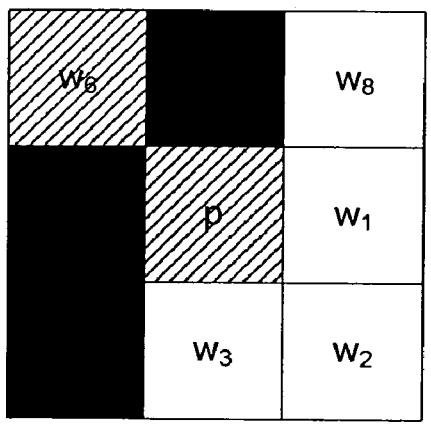
Figure 5D:
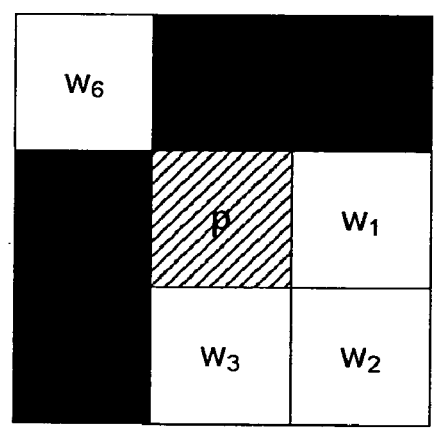

Example blocks meeting conditions (1), (2) and (3) are illustrated in FIG. 5D. Again, rotations and reflections of the depicted blocks will similarly satisfy these conditions.

$N_{VHW}$, $N_{VHB}$ for each block is thus calculated before and after flipping the centre pixel in step S302 (FIG. 3). If $N_{VHW}$ and $N_{VHB}$ do not change before and after flipping, as determined in step S304, flipping the pixel will not destroy the connectivity between pixels in the block. Therefore the pixel can possibly be flipped to embed watermark data. Otherwise, the pixel cannot be flipped, as it will create a hole or break the connectivity in the original pattern. $N_{IRtrans}$ before and after flipping is determined in step S306. Again, if $N_{IRtrans}$ does not change before and after flipping, as determined in step S308, flipping the pixel will not destroy the connectivity between pixels in the block. If $N_{IRtrans}$ does not remain invariant, as determined in step S308, the block is marked as not watermarkable in step S314. These two conditions are collectively named as "Connectivity-Preserving" criteria.

The pixels that meet the first condition have at least two white 4-neighbours and are thus boundary pixels. The blocks that meet the second condition will not create an isolated pixel as a result of flipping the centre pixel (a pixel has eight white neighbours). Furthermore, by satisfying the first and second conditions, the lower right corner of the block has three white pixels. This further ensures that flipping the centre pixel won't destroy the local connectivity of the pattern.

Finally, if $N_{VHtrans}$ and $N_{IRtans}$ remain invariant after flipping, $N_{Ctrans}$ is similarly calculated before and after flipping in step S310. If $N_{Ctrans}$ remains invariant as assessed in step S312, the block is marked as watermarkable in step S316. $N_{Ctrans}$ is used mainly to control, not to flip pixels in sharp corners, as it is very annoying to human observers.

Conveniently, enforcing the three conditions does not create noticeable holes, erosions, or protrusions in the watermarked images. As well, as the calculations performed in steps S302, S306, and S310 are logical, embedding of watermark data may be effected quickly and possibly in real time.

Once those blocks that lend themselves to carrying embedded data are identified, they are noted as such in step S208 (FIG. 2). Watermark data is received in step S214 and may be embedded in each of the blocks bit by bit in step S218. Assuming that Q blocks within a W×H image lend themselves to carrying a bit of data are identified, up to Q bits of watermark data may be embedded. Watermark data is embedded in step S220 by enforcing the parity of the number of black pixels in the block. In particular, to embed the watermark bit "0" or "1" in a block, the centre pixel is either flipped or not flipped to ensure that the total number of black pixels within the block is an even or odd number, respectively. Thus, the parity of a block defines the value of a bit embedded in the block.

$$\mathrm{mod}(B(p),2)=\mathrm{bits\_to\_be\_embedded}.$$

However, the use of block parity is vulnerable to unauthorized alteration. That is, for a given block, an unauthorized third party could easily modify some pixels within the same block without altering the parity of the block. Accordingly, the watermark could still be verified even though the image has been altered.

To avoid this, a fingerprint-hash value of the document before the watermark embedding may optionally be computed in step S212. As well, the hash of the watermark data or the document including the watermark may be calculated in step S216. One or both hash values may be incorporated into the watermark data in step S218 to ensure the authenticity of the document. Hash values may be appended or XORed with the remaining watermark data. That is, the data embedding pixels in all watermarkable blocks of the image (as determined in steps S206-S210) may be set to a known value (i.e., all black or white) and a hash of the modified image may be calculated. The hash may be calculated using conventional techniques (such as MD5, etc.).

The hash value can optionally be encrypted by using a public key cryptographic algorithm (e.g. RSA or similar) with the private key of the issuer to form a digital signature. This digital signature (e.g. 1024 bits) can then be either concatenated or XORed with the original watermark data to generate the final watermark.

The final watermark may be embedded in the binary documents bit by bit in steps S220-S222. Conveniently, no additional information need be conveyed with the watermarked document in order to allow extraction and verification of the watermark data.

As will be appreciated, the number of available bits to carry watermark data (Q) will vary depending on the number of pixels in the document, and the document type and pattern, as well as the size of the blocks. Probabilistically, Q may be approximated as follows for an image of dimension W×H and m×n block size. The number of such blocks in a W×H image $$\mathrm{NumBlocks}=\lfloor(W/m)\rfloor\times\lfloor(H/n)\rfloor$$

where $\lfloor x \rfloor$ is the largest integer less than or equal to x.

Using the three exemplary conditions for flippability within the block: VH Transition, IR Transition and C Transition respectively one may assume the probability a block will satisfy the first criteria is $p_1$; the probability a block will satisfy the first criteria but is excluded by the second criteria is $p_2$; and the probability a block will satisfy the first criteria but is excluded by the third criteria is $p_3$. It should be noted that $P_1 \geq (p_2+p_3)$ always hold, as $P_2$ and $p_3$ are the probabilities of the excluding cases from $p_1$.

Thus the total capacity of the image can be deduced as, $$Q=\mathrm{NumBlocks}\times(p_1-p_2-p_3).$$

By employing the fixed block of size 3×3 and choosing the centre pixel for watermark embedding, the capacity to embed data is adequate. However, the capacity is somewhat limited due to the fact that a fixed location within each block is selected to carry watermark data. The available blocks which satisfy the flipping conditions are also limited.

In an alternative embodiment, in order to increase the watermark data capacity without requiring additional information about the location of each watermark data pixel, the ability to hide data within overlapping blocks within larger super-blocks may be assessed.

Figure 7:
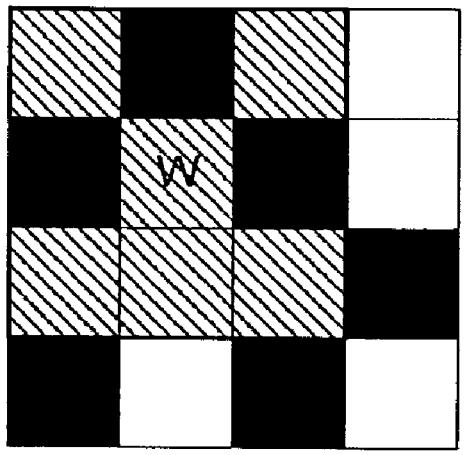
FIG. 7 illustrates a window overlapping a 4×4 super-block of the 8×8 image of FIG. 6.
Figure 7:
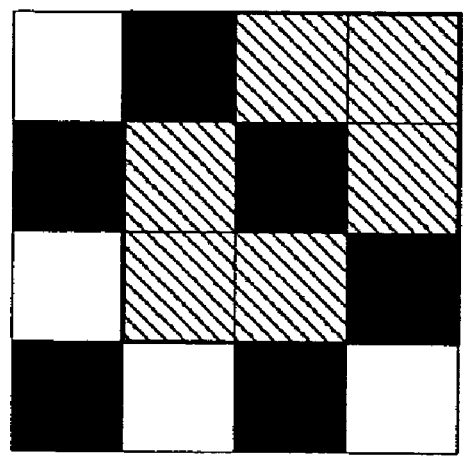
Figure 7:
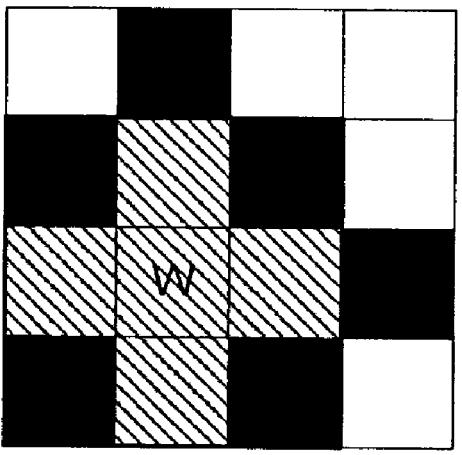
Figure 7:
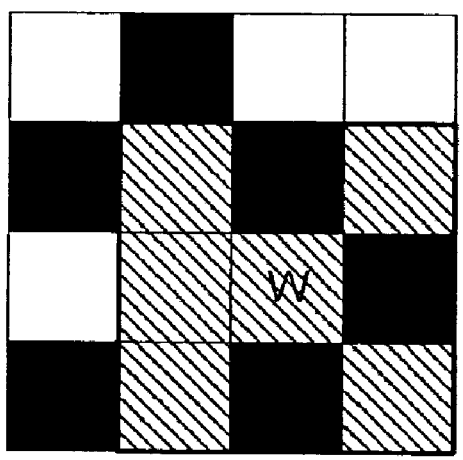

Specifically, as illustrated in FIG. 6, instead of dividing an image into blocks of size 3×3, one may divide an image into non-overlapping super-blocks, each greater in size than 3×3. In the depicted example of FIG. 6, an 8×8 image is divided into four 4×4 super-blocks. Within each super-block, a 3×3 window is moved to assess whether potentially overlapping 3×3 blocks within the super-block are capable of hiding data. The window is initially positioned in the upper left corner of a super-block, and thereafter advanced to the right in the initial row, and then downward to further rows. Sequential window positions for the upper left 4×4 super-block of FIG. 6 are illustrated in FIG. 7.

Conditions (1)-(3) for the block covered by the window are assessed using steps S300 to determine whether this block could hide a bit of data. Next, the window is advanced to its next position, and conditions (1)-(3) are again assessed for the centre pixel of the block covered by the window in its next position. Possibly multiple 3×3 blocks within a 4×4 super-blocks may be used to hide data. However, because 3×3 blocks now overlap, a change in the centre pixel of the block under the window, as advanced, may affect the ability of previous or subsequent blocks to hide a bit of data. That is, pixels $w_5$, $w_6$, $W_7$, and $w_8$ of a block (see FIG. 4 for pixel naming conventions) covered by a current window may form part of blocks previously covered by the window, above and to the left of the current window, or subsequent blocks. Thus, if the window covers a block that may store one bit, up to four earlier blocks containing this pixel are re-assessed to ensure that conditions (1)-(3) remain satisfied for those earlier blocks. If the centre pixel of the block does not affect the four earlier adjacent blocks, whose suitability to hide a bit of data was previously assessed, the pixel is identified as possibly storing data. If the centre pixel renders a previously assessed pixel as unsuitable, the window is simply advanced without noting that the block covered by the window in its current position is watermarkable. As well, data in a block is embedded prior to advancing a window. Thus, the evaluation of blocks covered by a window in subsequent positions accounts for the effect of previous blocks.

The window is advanced within each super-block until all possible 3×3 blocks within the super-block are assessed as watermarkable or not.

Figure 8:
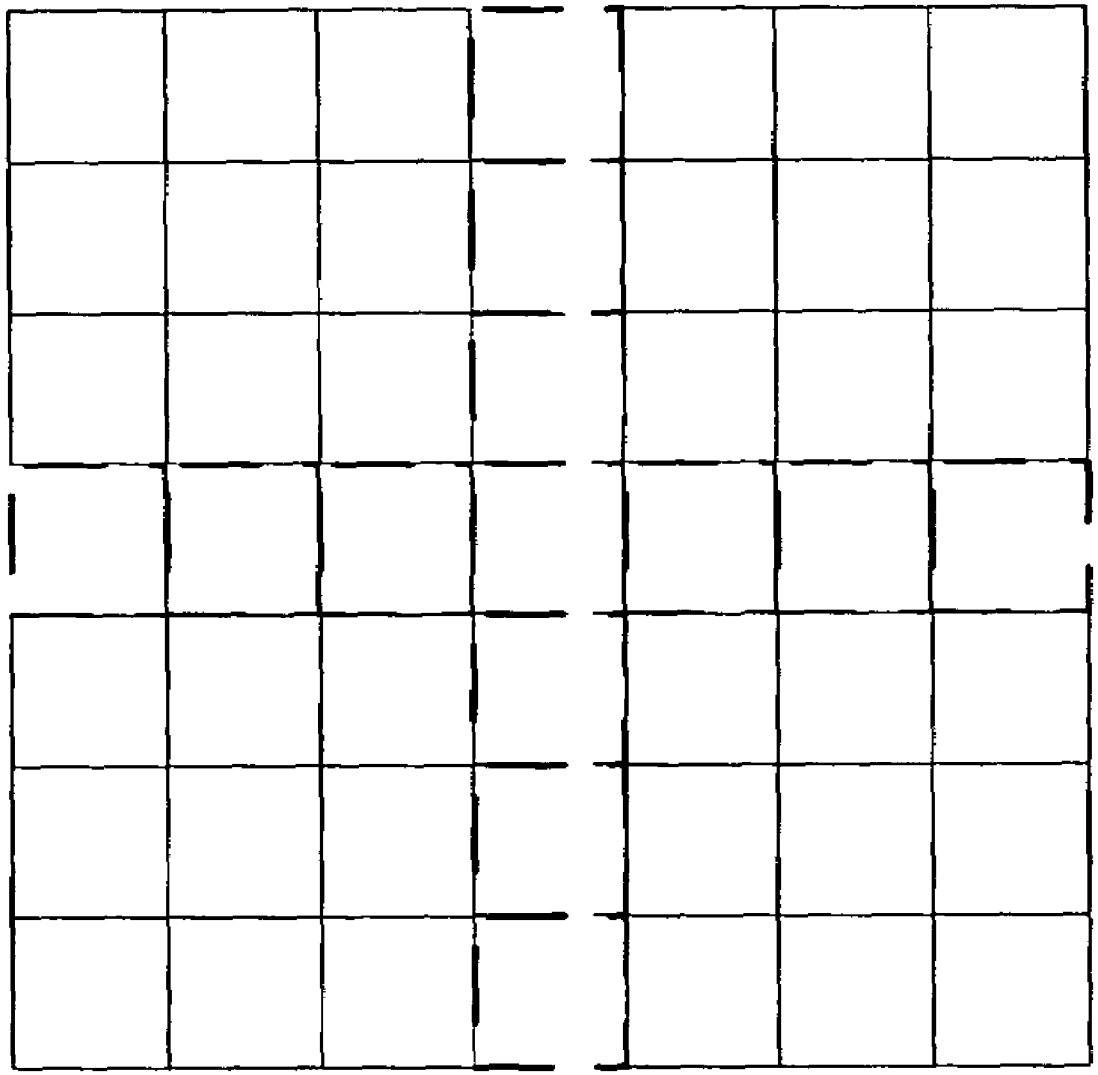
FIGS. 8 and 9A-9B illustrates the division of an exemplary 7×7 pixel image, into four overlapping 4×4 pixel super-blocks.
Figure 9A:
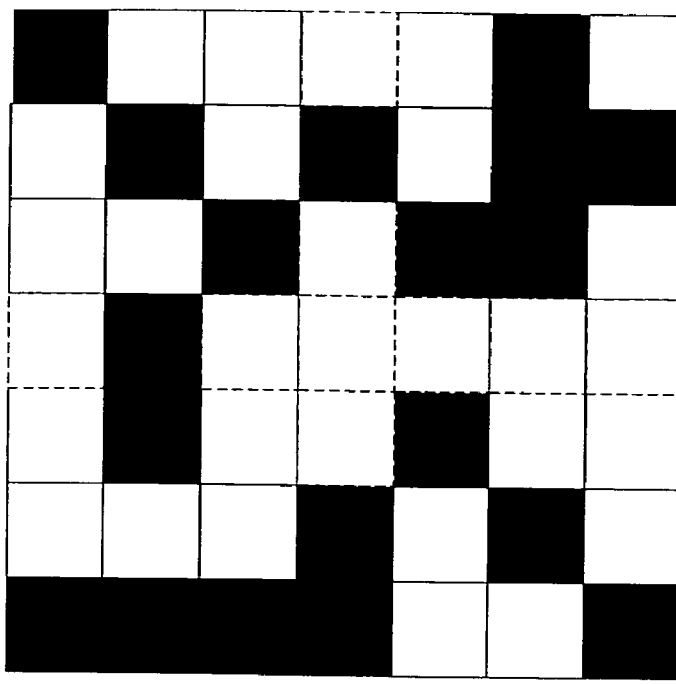
Figure 9B:
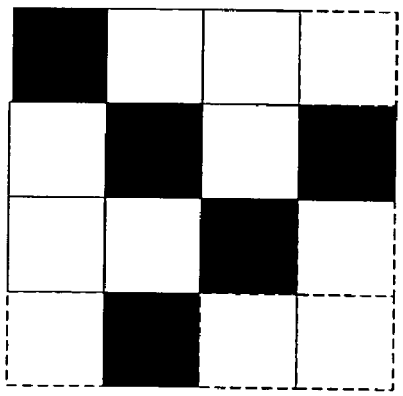
Figure 9B:
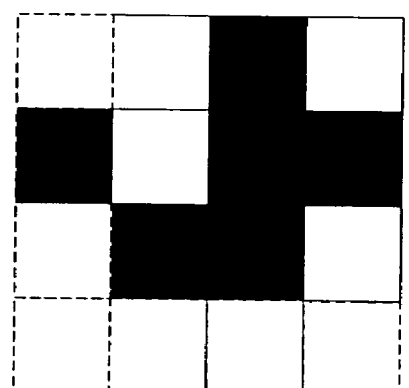
Figure 9B:
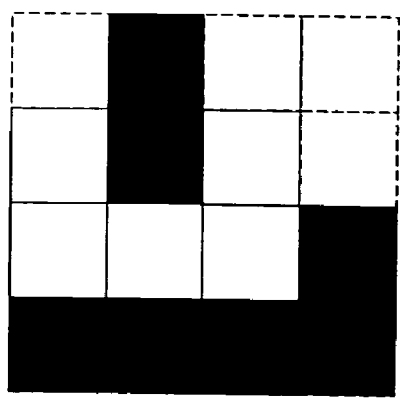
Figure 9B:
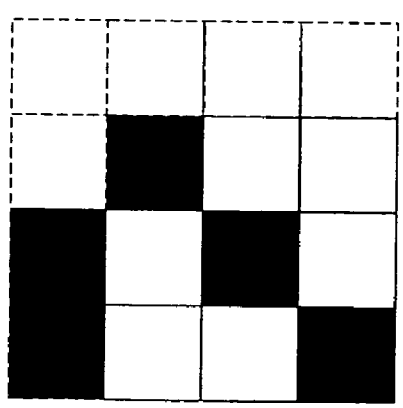

Alternatively, so that a change in one pixel does not affect the ability to embed data in previous blocks, overlapping super-blocks may be used and a single bit may be embedded in each super-block, as exemplified in FIGS. 8 and 9A-9B. The overlapping super-block size can be any size which is greater than 3×3 pixels.

In the example of FIG. 8, a 7×7 pixel image is divided into four overlapping super-blocks, each with block size of 4×4 pixels. Any two of these super-blocks share a common row or column as is illustrated in the row and column marked in dotted lines in FIG. 8. The resulting division of the 7×7 block into four 4×4 super-blocks is shown in FIG. 9A-9B.

So, one half of the boundary pixels of each block is the starting row or column of the next block. By increasing the super-block size, the likelihood that a super-block contains a single block meeting the conditions (1)-(3) is increased significantly.

Thus, once overlapping super-blocks have been assessed, the suitability of each super-block to carry watermark data is made in step S206, by assessing the suitability of 3×3 blocks within a larger (e.g. 4×4) super-block using steps S300 (FIG. 3), until a watermarkable block is found within a super-block. Again, a 3×3 window may be used to locate a watermarkable block. The window may be advanced from left to right in each row, and from top to bottom. So, for each overlapping 4×4 block, four 3×3 sub-blocks are identified, and potentially assessed for suitability. However, only a single 3×3 block within a 4×4 super-block is used to embed watermark data.

As two neighbouring blocks share one common row or column for the overlapping 4×4 super-blocks it is difficult to set the same rule to locate the flipped pixel. In such a case, after flipping the pixel, the watermarked document is generated. The hash value can be computed using the watermarked image and the hash value may be sent to the receiver through a separate channel. Of course, in this way, extra bandwidth is required to transmit the hash value to the receiver side.

Notably, the suitability of the previous four blocks need only be re-assessed when flipped pixels are to be located, for example to apply the hash function to generate the watermark. By re-assessing previous blocks, the capacity of the image to embed watermark data will decrease compared with the results shown in Table 1. Experimentally, the capacity has been shown to decrease by about $\frac{1}{5}^{th}$ of the original capacity. Of course, for both non-overlapping and overlapping schemes, watermark data can be extracted without locating the exact locations of the flipped pixels. The original image, however, may not be recovered.

This may be observed by noting that flipping one pixel will affect the suitability of its eight neighbours. However, since boundary pixels (for non-overlapping blocks) or pixels in shared rows and columns (for overlapping blocks) are excluded from flipping, the change caused by flipping the current pixel does not propagate to other blocks. Only changes in boundary pixels will affect the suitability of neighbouring blocks. Even if flipping one pixel changes the suitability of its eight neighbors, however, these eight neighbors still fall in the same block. So, a block that is "embeddable" remains "embeddable" in the watermarked image. The watermark can thus be extracted blindly from the watermarked image by the checking for embeddable blocks.

Tests have been performed on example images to assess any increase of available embedding blocks by employing the overlapping block, the results is shown in Table 1.

TABLE 1

Comparisons of the capacity of different embedding methods.

| File name (.tif) | Size (W × H) | Cap. Non-overlp 3 × 3 blocks (bits) | Cap. Non-overlp 4 × 4 super-blocks (bits) | Cap. Overlp 3 × 3 blocks (bits) | Cap. Overlp 4 × 4 super-blocks (bits) | Cap. Overlp 5 × 5 super-blocks (bits) | Cap. Overlp 6 × 6 super-blocks (bits) |
|---|---|---|---|---|---|---|---|
| Woman | 416 × 691 | 610 | 665 | 854 | 1169 | 1129 | 1028 |
| French-4 | 512 × 512 | 1795 | 2448 | 3383 | 4389 | 4282 | 3822 |
| Pangirl | 361 × 359 | 248 | 261 | 396 | 478 | 462 | 383 |
| Puretext | 534 × 534 | 1139 | 1518 | 2267 | 2725 | 2368 | 1934 |
| Purechin | 540 × 540 | 1845 | 2180 | 3229 | 3905 | 3522 | 3054 |

TABLE 1-continued

Comparisons of the capacity of different embedding methods.

| File name (.tif) | Size (W × H) | Cap. Non-overlp 3 × 3 blocks (bits) | Cap. Non-overlp 4 × 4 super-blocks (bits) | Cap. Overlp 3 × 3 blocks (bits) | Cap. Overlp 4 × 4 super-blocks (bits) | Cap. Overlp 5 × 5 super-blocks (bits) | Cap. Overlp 6 × 6 super-blocks (bits) |
|---|---|---|---|---|---|---|---|
| Test204 | 204 × 204 | 221 | 278 | 426 | 517 | 474 | 421 |
| Chinese | 336 × 336 | 482 | 733 | 1052 | 1261 | 1159 | 984 |
| Typetext | 336 × 336 | 447 | 672 | 1006 | 1237 | 1153 | 991 |
| Handwritten | 336 × 336 | 313 | 454 | 741 | 972 | 941 | 858 |
| Japanese | 336 × 336 | 526 | 822 | 1180 | 1488 | 1364 | 1188 |

As can be seen from Table 1, for the example documents of different types and different resolutions, by using overlapping super blocks, the embedding capacity is increased significantly. Experimentally, it may be observed that the capacity of the overlapping super-blocks reaches its maximum when the super-block size is 4×4. For non-overlapping blocks, the capacity reaches its maximum when the super-block size equals 4×4, 5×5 or 6×6, depending on the document type and pattern distribution. So, the preferred size for non-overlapping super-blocks will be 4×4 or 5×5. For overlapping super-blocks, the preferred size is 4×4.

For overlapping super-blocks any super-block size larger than the block size (e.g., 3×3) may be used. Assuming the super-block size to be bsize_x and bsize_y, for an image with size Width×Height, the total number of super-blocks in the image may be expressed as:

$$N = \lfloor 1 + (\text{Width} - \text{bsize\_x} + 1)/(\text{bsize\_x} - 1) \rfloor \times$$
$$\lfloor 1 + (\text{Height} - \text{bsize\_y} + 1)/(\text{bsize\_y} - 1) \rfloor$$
$$= \lfloor \text{Width}/(\text{bsize\_x} - 1) \rfloor \times \lfloor \text{Height}/(\text{bsize\_y} - 1) \rfloor$$

It is thus apparent that the total number of blocks has increased by overlapping the two neighbouring super-blocks.

Assuming the probabilities of a super-block satisfying the first condition is $p_{11}$, the probability of a blocks being excluded by the second condition is $p_{12}$. and the probability that a blocks is excluded by the third condition is $p_{13}$. Then, the total watermark data capacity can be estimated by:

$$\text{Capacity} = N \times (p_{11} - p_{12} - p_{13})$$

Now, the probabilities of $p_{11}$, $p_{12}$ and $p_{13}$ are higher than the corresponding probabilities $p_1$, $p_2$, and $p_3$ defined for non-overlapping blocks, as a moving window is employed and the patterns are searched through the whole super-block instead of only the centre pixel inside one block. The increase of the probabilities within each block can be increased by factor of $$(\text{bsize\_x} - 2) \times (\text{bsize\_y} - 2).$$

To summarize, the capacity of the proposed non-overlapping blocks and overlapping super-block depends on the probabilities of the occurrence of the patterns which satisfy the transition conditions as well as the super-block size used. A larger super-block size will increase the probability of a block meeting conditions (1)-(3) within the super-block but at the cost of decreasing the total block numbers. Experimental evidence searching for a single watermarkable block within neighbouring super-blocks increases the watermark data capacity significantly.

Once the blocks that are capable of storing a bit of watermark data are identified using non-overlapping 3×3 blocks, overlapping blocks, or overlapping super-blocks, up to Q bits of watermark data may be embedded in the image. For any document, Q will of course vary depending on the method used to identify watermarkable blocks.

Watermark data can be any sequence of data. For example, pseudo-noise ("PN") sequences or biometric data of the document author, owner, or distributor (e.g., fingerprint of the authorized user) could be embedded in the document. If biometric data is used, the watermark data can be captured either live or stored in a repository. Data can be converted to 1 D barcode format so that a sequence of 1's and 0's will be embedded in the document. When the watermark is extracted, a 1 D bar code can be generated for scanning. For watermark data which is in an image format, a 2D bar code format could be used and a 2D bar code may be extracted. A fingerprint image may thus be embedded. The watermark data may be generated directly at device 12 using software exemplary of embodiments of the invention.

As an illustration, a Gold-like sequence, as for example detailed in P. Fan and M. Darnell, "Sequence Design for Communications Applications", Research Studies Press, 1996, may be used as the watermark data. Preferably, a Gold-like sequence having a linear span 2m formed from a seed S is used as the watermark data because of its noise-like characteristics, good autocorrelation features, and resistance to interference. The seed S can be any information provided by or derived from the authorized user/owner. S can be the system time stamp as well. The method for generating a seed for use to generate the Gold-like sequence from S can make use of a standard seed generator.

Figure 10:
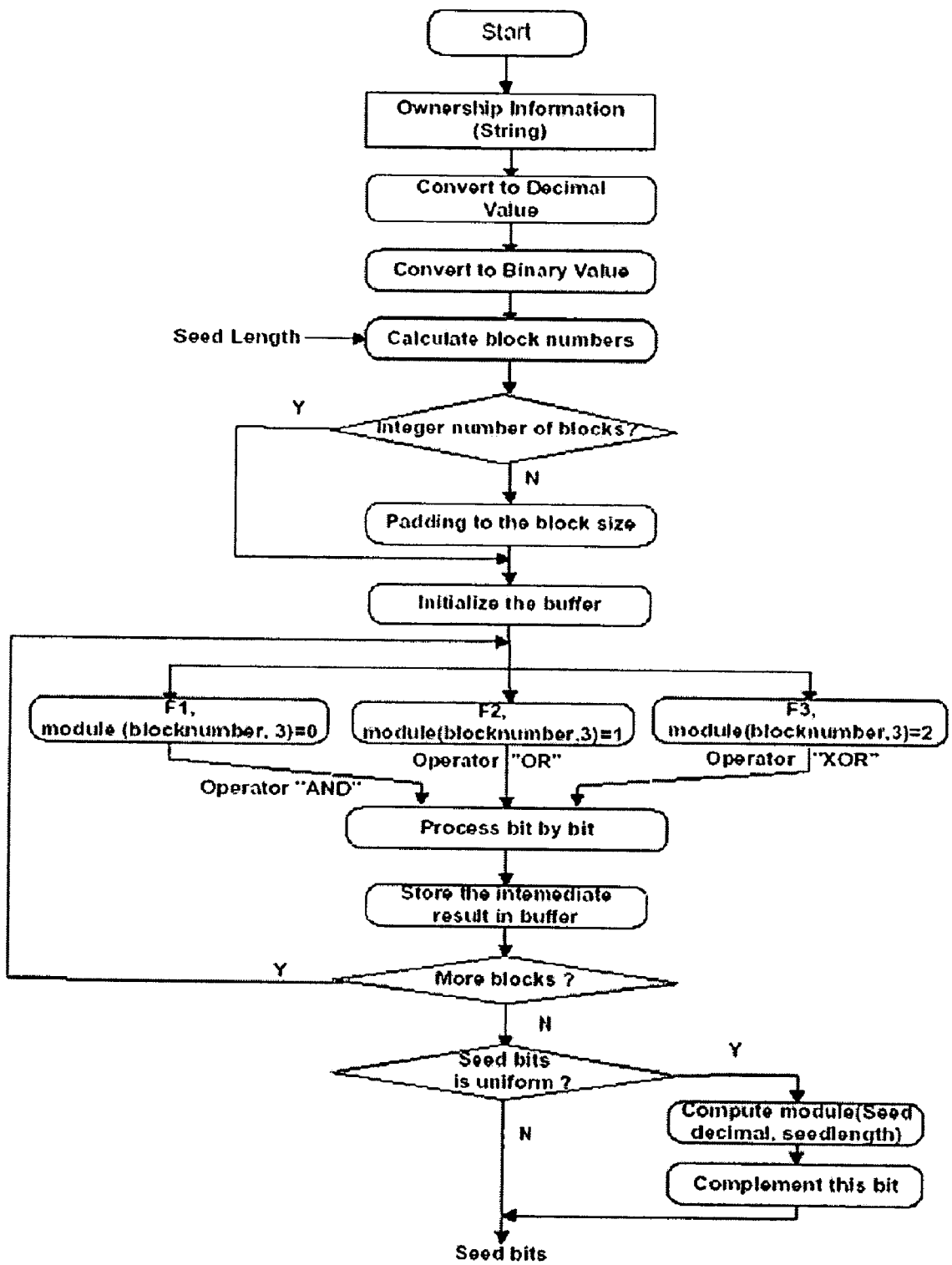
FIG. 10 is a block diagram of a seed generator used to generate a seed to generate a pseudo-random sequence to be embedded in a document.

For example, as illustrated in FIG. 10, S in the format of a string format, e.g., "!@#$ASDf;" may be provided to the seed generator. S may be converted to a decimal value (using, for example, an ASCII mapping) and then to a binary value. S is then divided into blocks. Each block has the same number of bits of the seed used for the Gold-like sequence. The number of blocks in the provided data S is computed by dividing the total binary bit length of the ownership information by the desired seed length:

Block_num=binary_length/seed_length

If the block number is not an integer number, S may be padded with additional bits to make it an integer.

Now, in the depicted embodiment the block size and the seed size generated by the seed generator is double the length of a single Gold-like m sequence, i.e., the Gold-like sequence is generated by two m sequences. For example, if each Gold-like m sequence requires a six-bit seed, the total length of the generated seed is twelve bits.

Blocks of ownership information are combined to generate the seed using a plurality of logic blocks, having functions defined in Table 2. A buffer that is of the same length as the seed length is initialized to hold the intermediate result. Which of the logic blocks is used for each block of the provided information depends on the modulo 3 value of the block number, as defined in Table 2. For example, if the intermediate result is: 1 0 0 1 0 0 1 0 0 1 0 1, and the bits from the current block are: 1 0 1 1 1 0 1 0 0 1 0 0. If the current block is 3, modulo (3, 3)=0, so an "AND" function will be used for the calculation. That is: (1 0 1 1 1 0 1 0 0 1 0 0) AND (1 0 0 1 0 0 1 0 0 1 0 1) bit by bit. It is noted that the logic function can be used is not limited to the three logic functions defined in Table 2. After all blocks of the provided data S have been processed, 12 seed bits will be generated.

TABLE 2

| Module Value | Function Name | Function Value |
|---|---|---|
| 0 | $F_1 = f(R, A)$ | $R = (R \wedge A)$ |
| 1 | $F_2 = f(R, B)$ | $R = (R \vee B)$ |
| 2 | $F_3 = f(R, C)$ | $R = (R \oplus C)$ |

If the seed value after the above computation consists of all zeros or all ones, the modulo value of the input decimal value and the length of each seed may be computed, and the result will be used as the location where the bit needs to be complemented so that the total output seed never has a uniform value.

Thus, a particular input data S may be transformed into any one of a number of seeds for use in a pseudo-random noise generator, such as a Gold-like sequence generator. This provides randomness and unpredictability of the seed value given different inputs.

As will be appreciated, a Gold-like sequence may be generated from a primitive polynomial h(x) of degree m is needed with period $N=p^m-1$. The primitive polynomials h(x) can be expressed as:

$$h(x) = h_0 x^m + h_1 x^{m-1} + h_2 x^{m-2} + \ldots + h_{m-1} x + h_m$$
$$= \sum_{i=0}^{m} h_i x^{m-i}, h_i \in GF(p)$$

Where $h_0=1$, $p=2^m$ for binary m sequence. GF(p) is the Galois field, the residue class for any prime integer p.

The Gold-like sequence may be generated by generating the m sequences with polynomials $h_1(x)$ and $h_2(x)$ separately and then adding the two m sequences bit by bit.

For example, for $h(x)=x^6+x+1$ and $\tilde{h}(x)=x^6 h(x^{-1})=x^6+x^5+1$ are a pair of reciprocal primitive polynomials. a is a sequence generated from h(x), and b is a sequence generated from $\tilde{h}(x)$, both of period $N=2^m-1$. The Gold-like sequences I(a,b) can be obtained as, $$I(a,b)=\{a,b,a \oplus b, a \oplus Tb, a \oplus T^2 b, \ldots, a \oplus T^{N-1} b\}$$

Figure 11:
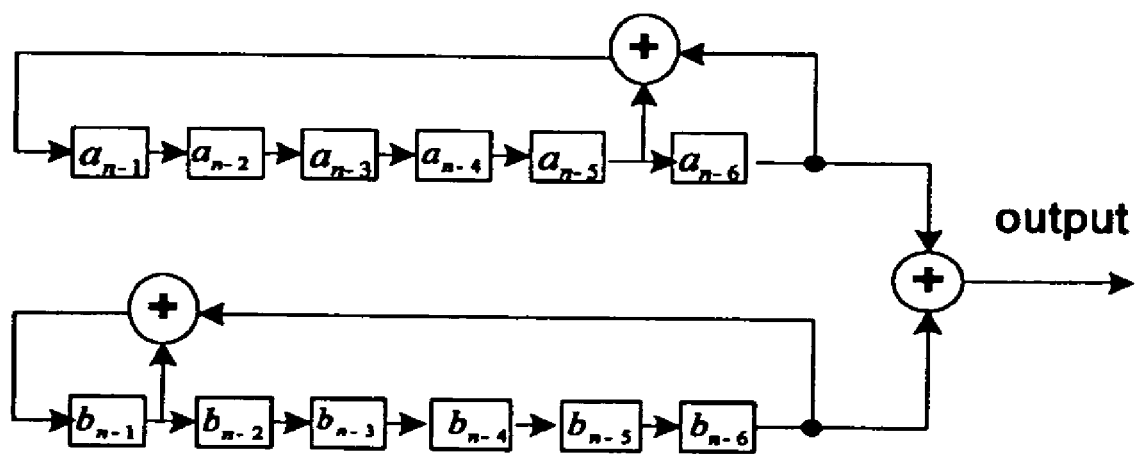
FIG. 11 is a block diagram of a Gold-like sequence generator, for generating a pseudo-random sequence from a seed, for embedding as watermark data.

Here, $\{a_n\}$ and $\{b_n\}$ are reciprocal m-sequences and T is a shift operator. A block diagram of a Gold-like sequence generation process is illustrated in FIG. 11.

For example, for the primitive polynomial $h(x)=x^6+x+1$, the sequence satisfies $a_n=a_{n-5} \oplus a_{n-6}, n \geq 7$), while for the primitive polynomial $\tilde{h}(x)=x^6+x^{5+1}$ the sequence satisfies $b_n=b_{n-1} \oplus b_{n-6}, n \geq 7$). The m sequence $\{a_n\}$ is generated by taking the first six bits of the seed value. Subsequent bits in the sequence are generated using the relationship $a_n=a_{n-5} \oplus a_{n-6}, n \geq 7$). The second m sequence $\{b_n\}$ is similarly generated using bits seven to twelve of the seed, and the relationship $b_n=b_{n-1} \oplus b_{n-6}, n \geq 7$). The number of rows of the Gold-like sequence depends on the period of the Gold-like sequence; the number of columns depends on the length of each m sequence. As may be observed from the definition of /(a,b) the fist row equals to a and the second row equals to b. From the third row final row N, the sequence b is shifted cyclically left shifted by n-2 bits, and then XORed with a to generate.

Figure 12:
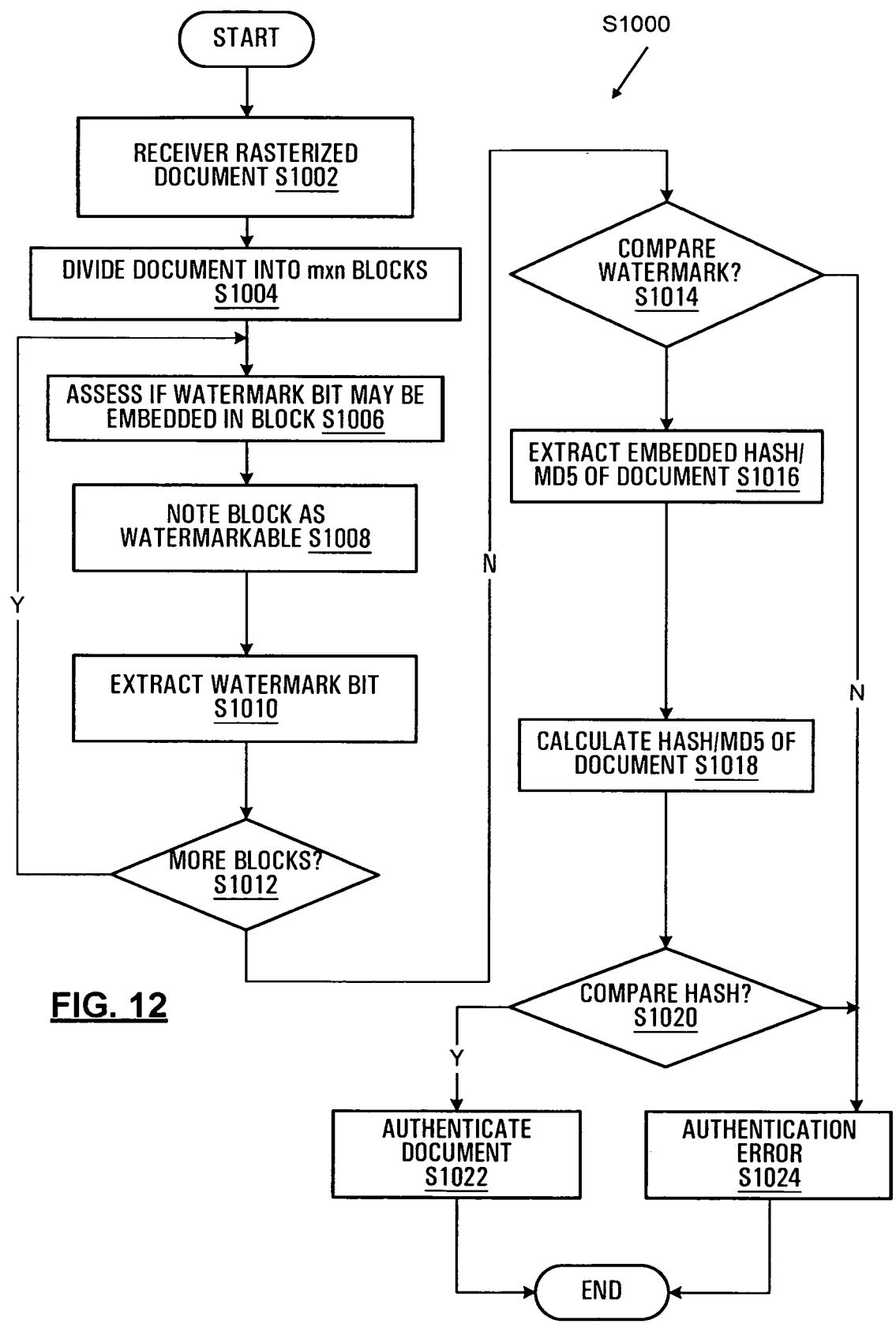
FIG. 12 is a flow chart of exemplary steps used to extract and verify watermark data from a document, in manners exemplary of embodiments of the present invention.

At a later time, watermark data that has been embedded may be extracted and verified, largely by reversing the embedding steps. Exemplary extraction verification steps S1000 are illustrated in FIG. 12. These may be performed at device 10, or at another similar device capable of extracting embedded watermark data. In the depicted embodiments, the extraction does not require any additional data other than the document and possibly the public cryptographic key of the document originator. However, the extraction process relies on knowledge of the exact embedding steps. As such, steps S1000 are complementary to steps S200 (FIG. 2), and assume that watermark data has been embedded using one of the techniques described above, in blocks or super-blocks as the case may be.

As illustrated, the image including watermark data is received in step S1002. The image is divided into blocks (or super-blocks) in steps S1004. In step S1006, an assessment of whether or not each block is watermarkable is made (vis. FIG. 3). For those blocks capable of carrying embedded data, the parity of the block is calculated in step S1010, to extract the watermark data bit. As well, the block is noted as watermarkable in step S1008. Steps S1006-S1010 are repeated for all blocks in the document. The watermark data may then either be presented, or compared to an expected watermark data in step S1014. If the extracted watermark data does not match the expected watermark data, an error may be reported in step S1024.

Optionally, the encrypted hash value of the original document may be extracted from the watermark data in step S1016. If required, the public key of the issuer will be used to perform the decryption and thus the hash value of the original document. The hash of the original document may again be calculated in step S1018 by setting the watermark embedding location of each watermarkable block, as noted in step S1008, to zero or another fixed value. In this way, the authenticity and integrity of the received document may be verified by comparing the embedded hash value to the calculated hash value in step S1020. If the hash values match, the document may be authenticated in step S1022. If not, an error may be reported in step S1024.

The authenticity of the document may thus be verified in two aspects. Firstly, the extracted watermark may be compared to the original watermark (step S1014). Secondly, the hash value of the watermarked document and the original document may be compared to ensure the document has not been altered (step S1020). If the two comparisons are successful, the authenticity and integrity of the document can be ensured.

Conveniently, use of a predetermined pixel within each block, and fixed conditions to assess when a block may contain a bit of watermark data, allows a watermarked document to be transferred to a recipient, and authenticated without additional information. The recipient, using the given conditions, can easily assess which blocks contain watermark data and extract embedded watermark data.

Additionally, in some digital imaging systems, it is desirable to convey ancillary information along with the actual data that helps to fully recover the original document. To this end, additional data may be embedded in the document to allow recovery of the original document.

Specifically, after receipt of the original binary image, watermark data is embedded using step S200/S300 (FIGS. 2 and 3), thus creating a watermarked document. Thereafter, recovery data may be generated by determining the difference between the original document and the watermarked document. For binary images, only a small percentage of the pixels will have changed to embed the watermark, so the redundancy of the difference data will be quite large. Difference data can be compressed using for example JBIG2 or ITU G3/G4.

The compressed difference data can be then be encoded in redundant spaces of the document or appended to the document to generate the final authenticated document. For example, the redundant data may be placed in blank space in the document occupied by margins and letterhead. The coded information will typically look like a 2D bar code.

After receipt of the watermarked document and recovery data, difference data may be extracted. Then, the watermark data may be extracted and authenticity of the document may be verified. Thereafter, the original binary image may be restored by replacing watermark data with the stored difference data.

In a further embodiment, watermarkable blocks may be associated with non-watermarkabe blocks, as detailed below. Conveniently, linking watermarkable blocks to non-watermarkable blocks may render the watermark embedding process more content-based. Whether the watermark can be embedded, and whether a pixel needs to be flipped will depend on the content of the embeddable blocks as well as an associated non-watermarkable blocks. Moreover, as changes in non-watermarkable blocks also affect the extracted watermark, unauthorized detection or change is more difficult as it is more difficult to assess whether a block is or is not watermakable and the watermark value.

For example, in order to reduce the size of the difference file, embedding a bit in each block as performed in step S220 may be modified. Specifically, instead of modifying the parity of a block to contain a desired bit, the parity of a block need only be modified if an associated non-watermarkable block has odd parity. Thus, a non-watermarkable block may be associated with each block that is identified as watermarkable in step S208. This association may, for example, be formed sequentially: the $n^{th}$ non-watermarkable block (as determined sequentially using steps S300) within an image is associated with the $n^{th}$ watermarkable block. Alternatively, the association between watermarkable and non-watermarkable could be established otherwise. For example, each watermarkable block could be associated with the closest non-watermarkable block that has not already been associated with a watermarkable block.

In any event, the existing parity of the non-watermarkable block associated with a watermarkable block may be used to assess whether parity should be enforced or not in the watermarkable block to embed data. That is, a bit will be embedded in a watermarkable block if (1) the pixel should be flipped in the watermarkable block to enforce parity of the watermarkable block and the parity of the associated non-watermarkable block is odd; (2) the pixel need not be flipped in the watermarkable block (the parity of the watermarkable block already matches the bit to be embedded) and the parity of the associated non-watermarkable block is even.

In order to recover embedded data, parity of the associated non-watermarkable block, together with its location, will indicate which blocks have been used in embedding data. The complete original image may thus be recovered by using the locations, the parity values of the associated non-watermarkable blocks and values of the pixels in watermarkable blocks.

In this way, statistically, about ¼ of the pixels that would otherwise be flipped need not be flipped, reducing the size of the difference image. Of course, some characteristic other than the parity of the associated non-watermarkable block could be used. For example, the value of one or more pixels in the associated non-watermarkabe block could be used to determine whether the watermarkable block's parity or its complement represents the embedded bit.

Non-watermarkable blocks may be used in association with blocks located using the described methods for fixed size non-overlapping blocks; overlapping blocks; and overlapping super-blocks.

In summary, the proposed connectivity-preserving and reversible binary watermarking methods could be used to issue electronic documents, such as electronic certificates or electronic birth certificates issued and authenticated by an issuing authority. It could be used by institutions such as universities, banks, or government agencies, where the authenticity of the document is necessary. Instead of keeping all the hard copies, the proposed method may facilitate document processing speeds and therefore save time and man power.

As will be appreciated, in the disclosed embodiments three separate unequivocal conditions are used to assess whether a defined pixel within a 3×3 block may be altered to store a bit of data within the block, without significantly altering the visual attributes of the block in a manner perceptible by the human eye. A person of ordinary will readily appreciate that other conditions could be used in addition, or instead of, those exemplified. Moreover, blocks of different sizes could be used. For example, 5×5, 7×7 or other m×n sized blocks could be used.

Additionally, a person of ordinary skill will readily appreciated that the defined conditions may be assessed in numerous ways. For example, FIG. 3 provides an analytical approach to testing if the conditions are met. Alternatively, conventional pattern matching techniques may be used to assess whether the appearance of blocks match the appearance of watermarkable blocks (as, for example, depicted in FIG. 5D). Other techniques of assessing if the conditions are met will be appreciated.

As well, as will be appreciated, colours black and white are used as examples herein. The terms "black" and "white" as used herein are intended to only illustrate the relative brightness of pixels, with a black pixel being darker than a white pixel. For example, data could be embedded in documents having documents using two colours of varying luminance (e.g. red and pink; navy blue and baby blue; etc.).

Of course, the above described embodiments are intended to be illustrative only and in no way limiting. The described embodiments of carrying out the invention are susceptible to many modifications of form, arrangement of parts, details, and order of operation. The invention, rather, is intended to encompass all such modification within its scope, as defined by the claims.

What is claimed is:

1. A method of embedding watermark data in a two colour rasterized image, said method comprising:

defining a plurality of 3×3 blocks in said image;

for each of said plurality of blocks, assessing whether a centre pixel of said block may be altered to store a bit of said watermark data within said block by determining if the number of black solid rows and columns and the number of white solid rows and columns through the centre pixel remains invariant before and after flipping the colour of the centre pixel, to determine a set of said plurality of blocks suited to store a bit of said data;

storing a bit of said data in each of said plurality of blocks assessed as suited to store a bit of said data.

2. The method of claim 1, wherein a block is assessed as suitable only if the number of white interior right angles through its centre pixel and around a black corner pixel also remains invariant before and after flipping the colour of said centre pixel.

3. The method of claim 2, wherein a block is assessed as suitable only if the number of adjacent black edge pairs about a black centre pixel also remains invariant before and after flipping the colour of said centre pixel.

4. The method of claim 1, wherein each of said 3×3 blocks forms part of a super-block having M×N pixels, divisible into blocks of 3×3 pixels.

5. The method of claim 4, wherein each of said super-blocks has dimensions of 4×4.

6. The method of claim 4, wherein each of said super-blocks has dimensions of 5×5.

7. The method of claim 1, wherein a bit of watermarked data is stored in a block by changing the colour of said centre pixel to enforce a parity of pixels of one of said two colours in said block.

8. The method of claim 1, wherein said image is a document.

9. The method of claim 1, wherein said plurality of blocks are non-overlapping.

10. The method of claim 1, wherein adjacent ones of said plurality of blocks overlap, and wherein said assessing within a block is made with reference to pixels within said block and with reference to pixels in at least one adjacent block.

11. The method of claim 10, wherein said assessing within a block comprises assessing whether flipping a centre pixel in said block alters whether a centre pixel within an adjacent block may be altered to store a bit of said data within said adjacent block without altering the visual attributes of said adjacent block in a manner to be materially perceptible to the human eye.

12. The method of claim 1, further comprising associating with each of said plurality of blocks assessed as suited to store a bit of said data, another block in said image assessed as not suited to store a bit of said data, and wherein said storing a bit of said data in each of said plurality of blocks assessed as suited to store a bit of said data, is performed in dependence on a condition of its associated another block.

13. The method of claim 12, wherein a bit of watermarked data is stored in a block by changing the colour of said centre pixel to enforce a parity of pixels of one of said two colours in said block, if a condition of its associated block is met.

14. The method of claim 13, wherein said condition of said associated block comprises a defined parity of dark pixels in said associated block.

15. Computer readable medium, storing processor readable instructions loadable at a computing device including a processor, that adapt said computing device to perform the method of claim 1.

16. A computing device comprising a processor and processor readable memory, said processor readable memory storing instructions adapting said computing device to perform the method of claim 1.

17. A method of embedding watermark data in a two colour rasterized image, said method comprising:

dividing said image into a plurality of n×n blocks, wherein n is odd and n>2; for each of said plurality of blocks, assessing whether a defined pixel within said block may be altered to store a bit of said data within said block without altering the visual attributes of said block in a manner to be materially percertible to the human eye, to determine a set of said plurality of blocks suited to store a bit of said data;

storing a bit of said data in each of said plurality of blocks assessed as suited to store a bit of said data wherein said watermark data comprises a pseudo random noise sequence.

18. The method of claim 17, wherein said watermark data comprises a data derived from a biometric indicator.

19. The method of claim 17, wherein said pseudo random noise sequence is generated using a seed.

20. The method of claim 17, wherein said seed is derived from an identifier of the originator of said image.

21. The method of claim 20, further comprising calculating a hash value of said image in which all of said watermark pixels are set to a pre-determined value.

22. The method of claim 21, further comprising incorporating said hash value with said watermark data.

23. The method of claim 22, wherein said hash value is concatenated or XORed with said watermark data.

24. The method of claim 23, further comprising calculating a difference between said image without said watermark data and said image with said watermark data, and incorporating said difference in said image.

25. The method of claim 21, wherein said hash value is appended to said watermark data.

26. A method of extracting watermark data from a two colour document, said method comprising:

receiving said two colour document containing said watermark data embedded therein;

dividing said document into n×n blocks, wherein n is odd and n>2;

for each of said plurality of blocks, assessing whether a defined pixel within said block may be altered to store a bit of said data within said block without altering the visual attributes of said block in a manner to be perceptible by the human eye, using at least one logical condition to determine a set of said plurality of blocks suited to store a bit of said data;

extracting a bit of said watermark data in each of said plurality of blocks assessed as suited to store a bit of said data.

27. The method of claim 26, wherein said at least one pixel is the centre pixel of each n×n block.

28. The method of claim 27, wherein a block is assessed as suitable only if the number of solid rows and columns through the centre pixel remains invariant before and after flipping the colour of the centre pixel.

29. The method of claim 28, wherein a block is assessed as suitable only if the number of interior white right angles through its centre pixel and around a black corner pixel remains invariant before and after flipping the colour of said centre pixel.

30. The method of claim 29, wherein a block is assessed as suitable only if the number of adjacent black edge pairs about a black centre pixel remains invariant before and after flipping the colour of said centre pixel.

31. The method of claim 26, wherein n=3.

32. The method of claim 26, wherein a bit of watermarked data is determined by determining the parity of pixels of one of said two colours in said block.

33. Computer readable medium, storing processor readable instructions loadable at a computing device including a processor, that adapt said computing device to perform the method of claim 26.

34. A method of determining if watermark data may be embedded in a two colour rasterized image, said method comprising:

dividing said image into a plurality of 3×3 blocks;

assessing whether a centre pixel of each of said blocks may be altered to store a bit of said data within said block, by assessing:

(a) if the number of black solid rows and columns and the number of white solid rows and columns through said centre pixel remain invariant before and after flipping the colour of the centre pixel;

(b) if the number of white right angles through its centre pixel and around a black corner pixel remains invariant before and after flipping the colour of said centre pixel; and (c) if the number of adjacent black edge pairs about a black centre pixel remains invariant before and after flipping the colour of said centre pixel.

* * * * *